Sept. 16, 1969     D. ROWLANDS ET AL     3,467,032
PALLETS FORMED FROM PLASTICS MATERIAL
Filed Aug. 17, 1967     4 Sheets-Sheet 1
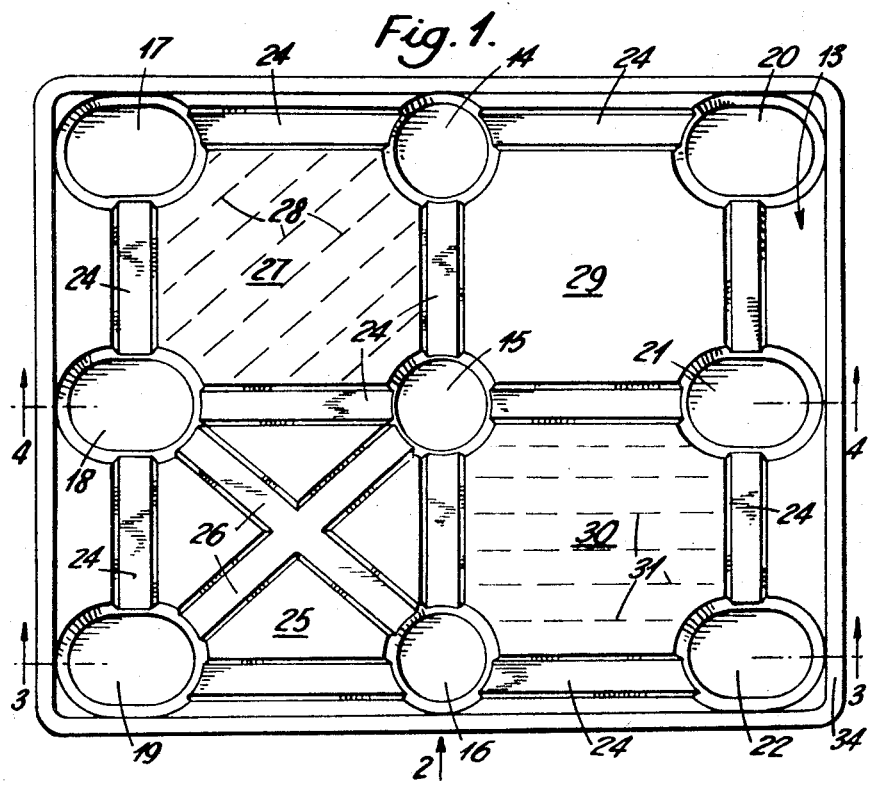
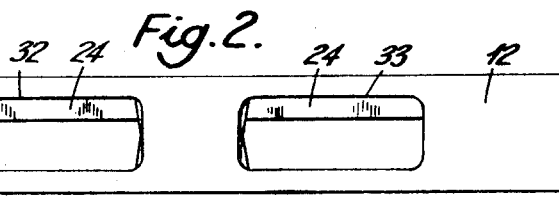
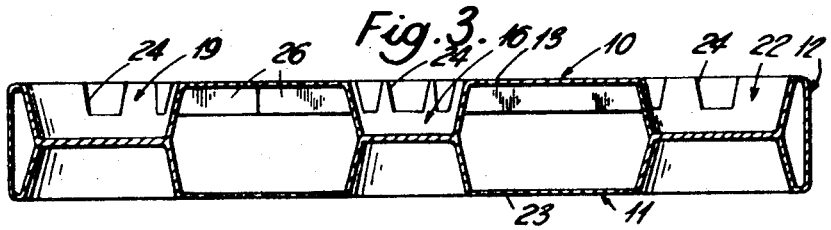
INVENTORS
DEREK ROWLANDS
ROY CHARTERTON
BY
Bacon & Thomas
ATTORNEYS

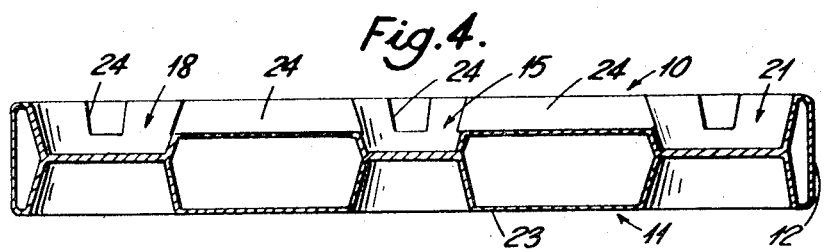
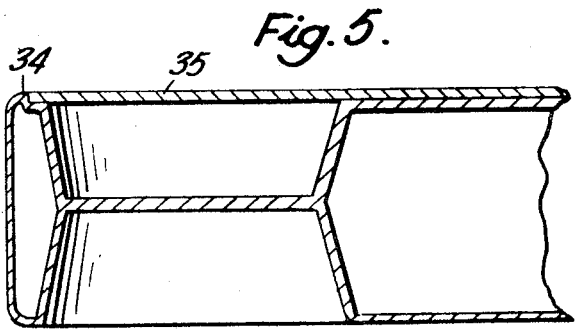
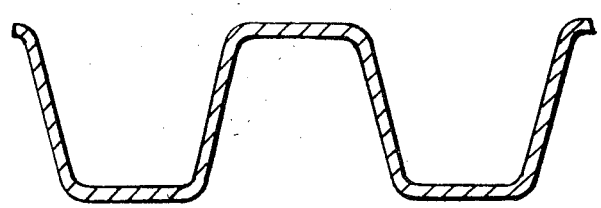
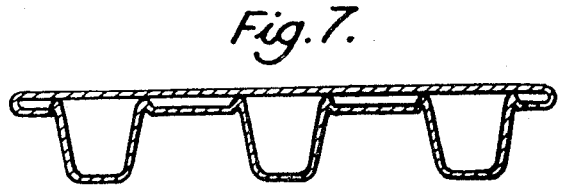

INVENTORS
DEREK ROWLANDS
ROY CHARTERTON
BY
Bacon & Thomas
ATTORNEYS

Sept. 16, 1969     D. ROWLANDS ET AL     3,467,032
PALLETS FORMED FROM PLASTICS MATERIAL
Filed Aug. 17, 1967     4 Sheets-Sheet 4
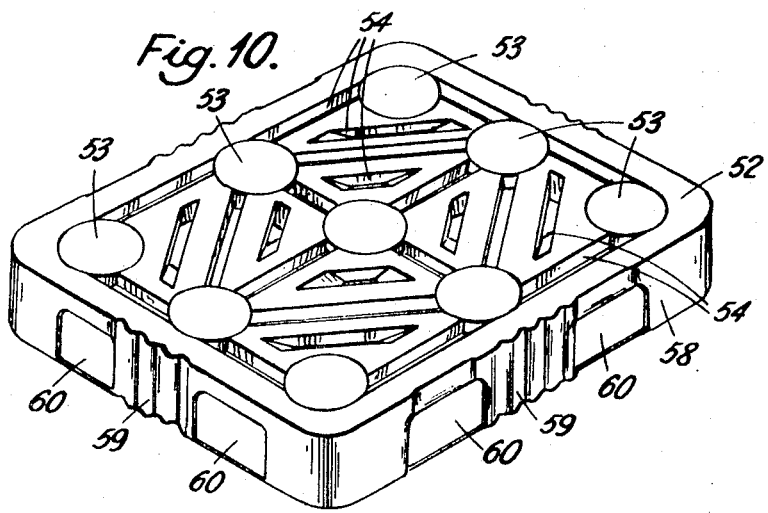
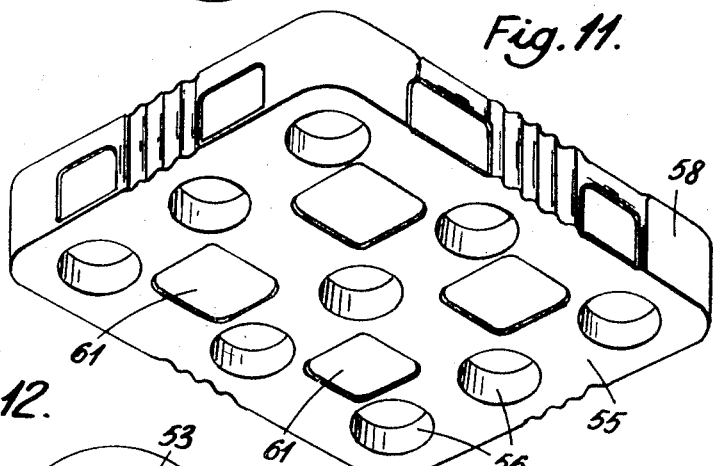
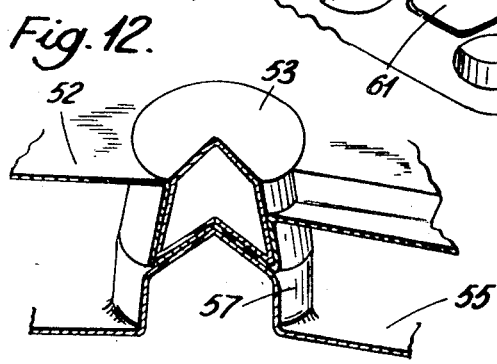
INVENTORS
DEREK ROWLANDS
ROY CHARTERTON
BY
*Bacon & Thomas*
ATTORNEYS

United States Patent Office 3,467,032
Patented Sept. 16, 1969

3,467,032
PALLETS FORMED FROM PLASTICS MATERIAL
Derek Rowlands and Roy Charterton, both of 7a Staple Inn, Holborn, London, WC. 1, England
Filed Aug. 17, 1967, Ser. No. 661,392
Claims priority, application Great Britain, Aug. 23, 1966, 37,851/66; Sept. 22, 1966, 42,383/66
Int. Cl. B65d *19/18*
U.S. Cl. 108—51                    6 Claims

ABSTRACT OF THE DISCLOSURE

A hollow pallet is formed from plastics material by a blow-moulding process carried out in a hollow mould the internal surface of which is provided with projections forming corresponding inwardly extending projections in the walls of the pallet, the projections from the upper wall of the pallet engaging the projections from the lower wall to form supporting pillars extending between the two walls. Each projection may be formed by urging a reinforcing element, such as a hollow plastics body of frusto-conical shape, against the wall of the pallet, from the outside, while the plastics material is in a plastic state during the blow-moulding process, so that the element becomes surrounded by and retained in the material of the wall of the pallet. The pallet has holes cut in its peripheral walls for the insertion between the projections of the fork arms of a fork-lift vehicle.

---

The invention relates to pallets formed from plastics material and particularly, but not exclusively, to pallets for handling by fork lift vehicles. By a "pallet" is meant a shallow support structure, usually rectangular, having an upper surface on which crates, boxes, bricks and other articles may be accommodated for convenient handling and transport, and sometimes referred to as a stillage.

According to the invention a method of forming a pallet from plastics material comprises forming the pallet by a blow moulding process.

Preferably the plastics material is extruded in a form suitable for use in a blow moulding process, and is immediately subjected to the blow moulding process to form the pallet. The pallet may thus be formed in one continuous operation, with a consequent reduction in the cost of producing each pallet.

The plastics material may be extruded in the form of a flattened tube, the tube being clamped between two halves of a hollow mould, the tube forming a parison into which blowing medium, usually air, is introduced under pressure to force the plastics material thereof outwardly against the faces of the mould halves.

The blow moulding process may be carried out in a hollow mould the internal surface of which is provided with projections adapted to form corresponding inwardly extending projections in the walls of the pallet, at least certain of which projections in the pallet are of such a height that they engage part of the opposite wall of the pallet. Such an arrangement in the case of a double skin pallet maintains the opposing walls of the hollow pallet spaced apart giving rigidity and strength to the pallet.

One or more projections from one part of the mould may be disposed opposite projections in the other part of the mould whereby the corresponding projections formed in the opposing walls of the pallet engage one another, so that each pair of opposed projections forms a pillar between the two walls of the pallet.

Preferably the moulding operation is so carried out that the inwardly extending projections in the walls of the pallet are welded to said part of the opposite wall or projection which they engage.

Any of the methods referred to above may comprise the further steps of forming openings in one or more peripheral walls of the pallet, which openings are of such a size and disposition as to permit the entry of the fork arms of a fork lift vehicle in spaces within the pallet extending from said peripheral wall or walls.

In any of the above methods at least a part of a wall of the pallet may, during the blow moulding process, be formed around a reinforcing element in such a manner that the element is retained by said part.

The part of the wall of the pallet may be formed around the reinforcing element by urging the element into the part from one side thereof whilst the plastics material is in a plastic state, so that the element becomes at least partially surrounded by the plastics material.

Preferably also the reinforcing element is so shaped that when partially surrounded by said part of the wall of the pallet it becomes interlocked with said part by reason of its shape.

The reinforcing element preferably has a surface thereof shaped to correspond to the external surface contour of the pallet, the surface of the element being brought level with the main surface of the pallet during forming of the part of the wall of the pallet around the reinforcing element, to give a substantially uninterrupted surface contour to the pallet.

In any of the above methods at least the outer surface of the reinforcing element is preferably formed from a plastics material which becomes bonded to the plastics material of the pallet during forming of said part of the wall of the pallet around the element. The reinforcing element may, for example, comprise a hollow body formed from plastics material.

In any of the above methods in which a reinforcing element is provided, the plastics material may be extruded in the form of a tube, the tube being clamped between two halves of a hollow mould to form a parison into which blowing medium, usually air, is introduced under pressure to force the plastics material thereof outwardly against the faces of the mould halves, and wherein the reinforcing element is then urged into the mould through an aperture in the face of the mould half so as to engage the outer surface of the article within the mould so that as the element is urged inwardly it becomes at least partially surrounded by the plastics material of the article which material is pressed closely around the reinforcing elements by the pressure of the blowing medium within the hollow structure.

Each half of the hollow mould may have in the walls thereof a plurality of spaced apertures each adapted to contain a reinforcing element, each aperture in one half of the mould being opposite an aperture in the other half of the mould, means being provided for urging the reinforcing elements from the apertures into the space within the hollow mould.

The reinforcing element is preferably so adapted as to close its aperture at the same level as the surface of the mould whereby the surface of the mould into which the structure is first blown is substantially uninterrupted before the reinforcing element is urged into engagement with the structure.

In any of the above methods the article formed by the blow moulding process may, after extraction from the mould, be cut along a plane parallel to the main faces of the article to form two single skin pallets.

The invention includes within its scope a double skinned pallet formed from plastics material and comprising a flat body, for the most part hollow, and having an upper wall, a lower wall, and peripheral walls, the upper and/ or the lower wall being formed with a number of depressions so as to form projections within the hollow body of the pallet, which projections engage a part of the wall opposite to that in which they are formed.

For example, an inward projection from the upper wall of the pallet may be opposite and engage an inward projection from the lower wall of the pallet so that the two projections form a pillar between the two walls of the pallet.

Preferably each projection is welded, bonded or otherwise secured to the opposing wall or projection which it engages.

In a pallet of any of the kinds referred to at least one depression in the wall of the pallet may embrace a reinforcing element. Preferably the reinforcing element substantially fills the depression, the outer surface of the reinforcing element being level with the general plane of the wall of the pallet surrounding the depression.

Two or more depressions in the lower wall of the pallet may extend across that wall from a part of the periphery thereof, which depressions are so shaped and dimensioned that the fork arms of a fork lift vehicle may be inserted along said depressions for the purpose of lifting the pallet.

Alternatively two or more holes may be formed in the peripheral walls of the pallet, which holes are so shaped and dimensioned and are so disposed in relation to said projections within the pallet that the forks of a fork lift vehicle may be inserted into the pallet through said holes without obstruction.

The following is a more detailed description of various embodiments of the invention, reference being made to the accompanying drawings, in which:

FIGURE 1 is a diagrammatic plan view of a pallet (a number of alternative forms of construction being shown in the figure):

FIGURE 2 is a side elevation of the pallet looking in the direction of the arrow 2 in FIGURE 1;

FIGURE 3 is a section along the line 3—3 of FIGURE 1;

FIGUE 4 is a section along the line 4—4 of FIGUE 1;

FIGURE 5 is a part section similar to the left-hand portion of FIGURE 3 and showing an alternative form of construction;

FIGURE 6 is a scrap section through a part of one wall of the pallet showing a form of corrugation or ribbing which may be employed;

FIGURE 7 is a diagrammatic section through an alternative form of pallet.

Figure 8:
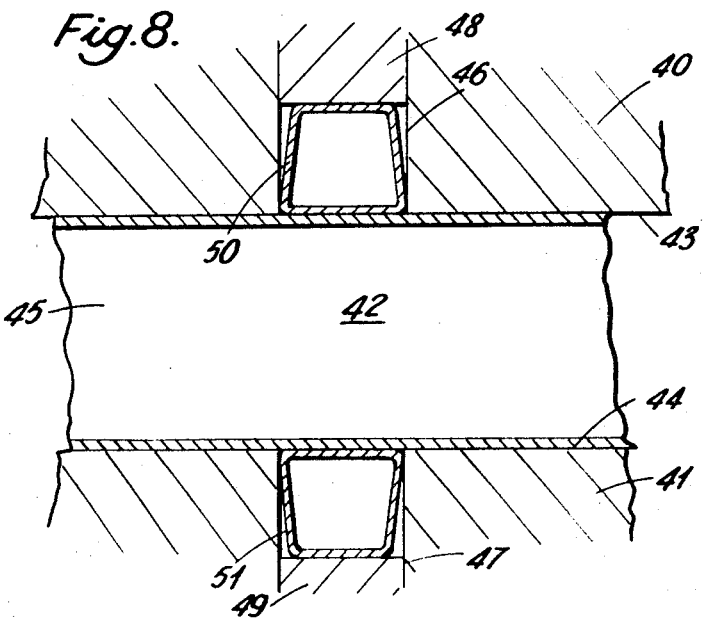
Figure 9:
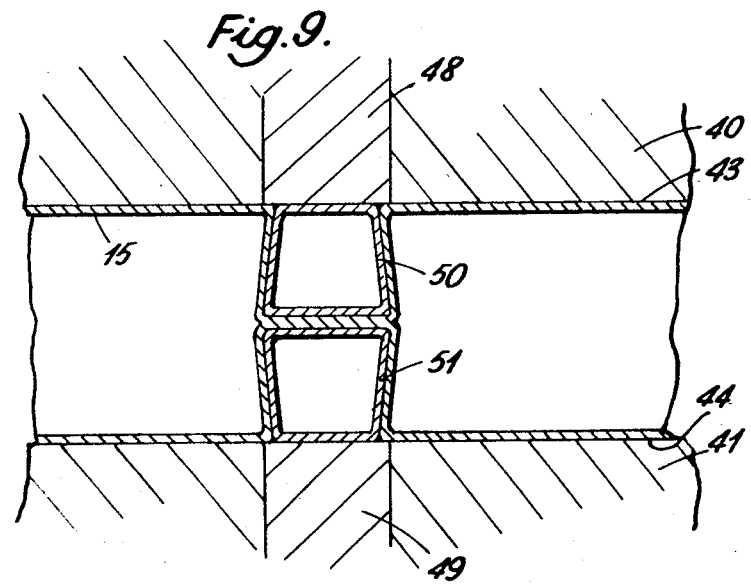

FIGURE 8 is a diagrammatic section through part of a mould in which is being formed, by a blow moulding process, a double skin plastics pallet;

FIGURE 9 is a similar view to FIGURE 8 showing the position at the later stage in the process.

FIGURE 10 is a perspective view, from above, of an alternative form of pallet;

FIGURE 11 is a perspective view, from below, of the pallet of FIGURE 10; and

FIGURE 12 is a cut-away view of part of the pallet of FIGURES 10 and 11.

The pallet shown in FIGURES 1 to 4 consists of an upper portion 10 and a lower portion 11 (see FIGURES 3 and 4). The two portions of the pallet are preferably integrally formed by a blow moulding process such as will be described later, but the two portions of the pallet may, if required, be separately formed, for example by a vacuum forming process, and then subsequently joined together, for example by welding or by an adhesive. In such a case there will be provided a seam (not shown) around the peripheral walls 12 of the pallet.

The upper wall 13 of the pallet is also formed with nine equally spaced depressions 14, 15, 16, 17, 18, 19, 20, 21 and 22, providing corresponding projections within the main body of the pallet. The three central depressions 14, 15 and 16 are circular in cross-section whereas the depressions 17 to 22 are oval in cross-section. Each of the depressions tapers inwardly as it extends downwardly to a flat bottom wall.

The lower wall 23 of the pallet is also formed with nine depressions, each depression being disposed opposite a corresponding depression in the upper wall so that opposing projections provided within the main body of the pallet by the depressions engage one another so that each pair of projections forms, in effect, a pillar extending between the upper and lower walls of the pallet (as seen in FIGURE 3). The opposing and engaging projections are preferably secured together. In the case where the two parts of the pallet are formed by a vacuum forming process and are subsequently secured together, the projections may be secured together by an adhesive or by welding. In the case where the pallet is blow-moulded the projections may be welded together during the blow moulding process as will be described later.

In the upper part 10 of the pallet the depressions are interconnected by tapered cross-section channels 24 providing corresponding ribs projecting downwardly from the upper wall 13 of the pallet and dividing the upper wall into four quarters. In FIGURE 1 each of the four quarters so formed is shown with an alternative form of construction although in any one pallet each quarter may be similarly formed.

In the lower left-hand quarter 25 of the upper wall there are shown a pair of diagonal reinforcing channels 26 similar in cross-section to the channels 24 and extending between the depressions 15 and 19 and the depressions 16 and 18 respectively.

In the upper left-hand quarter 27 there are indicated diagrammatically by lines 28 diagonal corrugations filling in the space enclosed by the channels 24.

The top right-hand quarter 29 is plain and in the lower right-hand quarter 30 there are shown lines 31 indicating the direction which corrugations may take in the space enclosed by the ribs 24. FIGURE 6 shows in enlarged cross-section an example of one form which the corrugations 28 and 31 may take. It will be appreciated, however, that any appropriate form of corrugation or other shaping may be applied to the wall 13 between the depressions so as to give the necessary rigidity to the upper wall.

Each of the four peripheral walls of the pallet is formed with two apertures 32 and 33 which are arranged opposite the gaps formed between adjacent pillars constituted by the aforesaid projections. The apertures 32 and 33 are of such a size and shape as to permit the insertion of the forks of a fork lift vehicle through the apertures and into the interior of the pallet between adjacent rows of pillars. As mentioned above, the apertures are preferably formed on all four sides of the pallet although it will be appreciated that they may, if required, be formed only on two opposite sides of the pallet. The sizes of the depressions/projections 14 to 22 is the largest which will permit the entry of standard forks between them and it is for this reason that the depressions 17 to 22 can be oval in shape since the overall contour of the pallet is slightly oblong as seen in FIGURE 1.

The purpose of the various forms of reinforcement 26, 28 and 31 on the upper wall of the pallet is to provide adequate rigidity for this upper wall since it is the upper wall which takes most of the strain when the pallet is lifted by a fork lift vehicle. However, the lower wall 23 of the pallet may, if required, be similarly formed with reinforcements and this is particularly desirable when it is required for the pallet to be reversible.

As seen in FIGURE 1 the upper wall of the pallet may be formed with a peripheral ridge 34 and as seen in FIGURE 5 the ridge 34 may be set back slightly from the upper edges of the depressions in the upper wall so that a decking sheet 35 may be placed on the upper wall within the ridge. The decking sheet 35, which may conveniently be formed from plastics sheeting, plywood, or any other appropriate sheet material, is placed on the upper surface of the pallet when the pallet is to be used for supporting relatively small objects the stacking of which may otherwise be upset by the depressions in the upper surface of the pallet.

It will be appreciated that in the above described arrangement the shape of the depressions may be varied without departing from the scope of the invention, and likewise the shaping of the walls of the pallet between the depressions, by corrugations or otherwise, to reinforce the walls may be of any convenient form. The pallet may also be reinforced by other means, for example, metal bands may be secured around the periphery of the pallet to give sufficient reinforcement for the pallet to be handled by slings.

The double-sided box-like pallet described above, besides having the advantage that it can be reversible as mentioned earlier, has several other advantages. For example, the plastics material used in forming the pallet can be thinner than in conventionally shaped pallets due to the inherent rigidity of the shape of the structure. Also the provision of a bottom surface for the pallet ensures a more even weight distribution beneath the pallet and a pallet may easily be constructed to meet, for example, the requirements for pallets to be used in aircraft that the bottom of the pallet should have a surface area of at least 60% of the top of the pallet.

In a blow moulding process for forming a pallet of the kind described above there is provided extruding apparatus for extruding plastics material in the form of a flattened tube, the flattened tube being passed between mould halves which are clamped together to enclose a portion of the flattened tube to form a parison. The blowing medium, usually air under pressure, is injected into the parison to force the plastics material outwardly against the faces of the mould to form the pallet. Preferably the bow moulding operation is effected immediately after the extruded material leaves the die and before the material has a chance to cool and it will be appreciated that since the pallet is formed from the raw plastics material in one continuous operation the cost of forming the pallet is thereby reduced.

The two halves of the mold are each formed with projections for forming the depressions 14 to 22 in the two portions of the pallet and the projections project to such an extent from the mould that the corresponding projections within the pallet engage one another as seen in section in FIGURES 3 and 4. Since the plastics material is at an elevated temperature for blow moulding, the two engaging surfaces of the projections become welded together to form a rigid pillar between the two walls of the pallet as referred to earlier.

In the case of a double skin pallet the parts of the pillars remain welded together. In the case where two single skin pallets are to be formed from the one moulding it is cut across a plane midway between the upper and lower walls. Thus in each single skin pallet there will be rows of projections extending downwardly from the underside of the main wall and the peripheral wall will be inverted U shaped in cross section and the flanges of the U will be slotted at 32, 33 opposite the spaces between the rows of projections.

It is also possible to carry out the blow moulding process so that the projections on the two walls do not become welded together in which case it is only necessary to cut through the peripheral wall to form the two single skin pallets.

It will be appreciated that many other forms of pallet may be formed from plastics material by the blow moulding process besides the variations of the pallet described above. For example, a hollow non-reversible pallet of the kind shown diagrammatically in cross section in FIGURE 7 may also be formed by a blow moulding process.

The pallets described above may be formed from any suitable plastics material, for example: High Density Polyethylene, Polypropylene, Acrylonitrile Butadiene Styrene (ABS), and Modified Rigid Polyvinyl Chloride.

In the arrangement described above in which projections are provided on the walls of the mould into which the pallet is blown, there is a tendency, when blowing begins, for the projections to prevent the plastics material from being forced outwardly into the extremities of the mould cavity. There will now be described, with reference to FIGURES 8 and 9, an arrangement for overcoming this difficulty as well as resulting in other considerable advantages.

Referring to FIGURE 8 a mould for blow moulding double skin pallets from plastics material comprises two halves 40 and 41 which are clamped together to form between them a mould cavity 42. A parison, which may be in the form of a tube of plastics material, is clamped within the mould and a blowing medium, usually air, is introduced under pressure into the parison to force the plastics material thereof outwardly against the faces 43 and 44 of the two halves of the mould.

In the position of FIGURE 8 the parison has been blown outwardly against the faces of the mould halves to form an intermediate hollow box-like structure 45.

Each half of the mould is formed with a number of spaced rows of cylindrical bores 46, 47 in which are reciprocable plungers 48, 49. The plungers 48 and 49 may be reciprocated in the bores by fluid energized rams or other appropriate power or manually operated mechanisms. Each bore 46 in one half 40 of the mould is disposed opposite a bore 47 in the other half 41 of the mould.

Before the two halves of the mould are clamped together around the parison there are inserted into the bores 46 and 47 reinforcing elements 50, 51. In the arrangement of FIGURE 8 each reinforcing element 50, 51 is in the form of a hollow frustrum of a cone the larger diameter end of the frustrum being of such a size as substantially to fill the bore and being substantially flush with the face of the mould half in which it is located. Thus when the parison is blown to form the intermediate box-like structure 45 the mould halves and reinforcing elements present a substantially smooth surface against which the plastics material is formed, thus preventing the formation of irregularities in the surface of the box-like structure.

The hollow reinforcing elements may be formed, for example, by blow moulding. Instead of being inserted in the mould halves before the halves are clamped around the parison, the plungers 48 and 49 may be arranged to be retractable from the bores 46 and 47 so that the reinforcing elements may be inserted in the bores from outside the mould.

After the box-like structure 45 has been formed as shown in FIGURE 8, the plungers 48 and 49 are urged inwardly to the position shown in FIGURE 9 where their end faces are flush with the inner surface of the mould halves. As the plungers 48 and 49 are urged inwardly they push the reinforcing elements 50 and 51 against the outer surface of the box-like structure 45 and deform the plastics material inwardly, the deformed plastics material around the reinforcing elements being urged closely into contact with the reinforcing elements by the pressure of the blowing medium within the box-like structure 45.

The reinforcing elements 50 and 51 are of such a size that when the plungers 48 and 49 are in the position shown in FIGURE 9 the parts of the walls of the box-like structure engaged by the two reinforcing elements meet within the structure and become fused together as shown in FIGURE 9. The two reinforcing elements thus form a continuous pillar extending from one side to the other of the completed pallet.

The reinforcing elements 50 and 51 are preferably formed from a plastics material which becomes bonded to the plastics material of the box-like structure 45 as the elements are pushed into the pallet. Alternatively the reinforcing elements may, as mentioned earlier, be formed from wood, metal or any other suitable material. In this case the reinforcing elements may be covered by a skin or sheet of plastics material which becomes bonded to the plastics material of the box-like structure as the reinforcing elements are inserted.

It will be seen that, due to their frusto-conical shape, the reinforcing elements become keyed within the pallet and it will be appreciated that many different shapes of reinforcing elements may be employed to achieve the same effect. For example, the reinforcing elements may be substantially cylindrical having undercut portions, such as peripheral grooves, into which the plastics material of the pallet becomes shaped so as to key the reinforcing elements in position.

In the case where single skin pallets are required, a double skin pallet may be formed in the manner described above, and may then be cut in halves along a plane extending through the mid points of the pillars. Alternatively the reinforcing elements may be of such dimensions that the parts of the walls of the box-like structure which they engage do not meet and fuse as described above, rendering it unnecessary to cut through the pillars. Alternatively a single skinned pallet may be formed by some other process, for example vacuum forming, in which case a single mould surface is employed through which reinforcing elements are introduced against one side of the single skin of the pallet, each reinforcing element constituting a "leg" of the single skin pallet.

It will be appreciated that since each reinforcing element has a part of its surface which, after injection of the reinforcing element, is level with the outer surface of the pallet, both the upper and lower surfaces of the pallet, (or the upper surface of the pallet in the case of a single skin pallet) are substantially smooth and thus the pallets are suitable for stacking small articles which might otherwise be dislocated by irregularities in the surface of the pallet. In the case where this is not important the reinforcing elements may be tubular or of any other convenient shape not necessarily providing a continuous smooth surface to the pallet.

The reinforcing elements may be of any required shape for example they may be elongated so as to extend across substantially the whole width of a panel-like structure. For example, in the case of a pallet, an elongated reinforcing element may extend across the whole width of the pallet and if the reinforcing elements are tubular they may be so disposed as to constitute the passages extending across the width of the pallet into which the fork arms of a fork lift truck may extend.

In an alternative form of apparatus for forming pallets from plastics material, reinforcing elements are not employed but the plungers in the walls of the mould halves are so arranged that they can be projected into the space within the mould after the initial formation of the plastics structure, so that the material of the structure forms pillars around the projecting plungers which are subsequently withdrawn again into the walls of the mould after the plastics material has set. The plungers must, of course, be so shaped that they can be withdrawn from the pillars which they form and in practice the parts of the plungers which extend into the mould must be tapered. This means that when the plungers are disposed within the bores in the walls of the mould and the initial structure is formed from the parison there is a tapering annular space between each plunger and its bore, into which space plastics material can be forced, and this may lead to irregularities in the surface of the finished pallet. To overcome this, the annular gap may be filled with two or more part annular fillers which can be withdrawn from the gap (from the outside of the mould) after the initial structure has been formed in the mould and before the plungers are extended to form the pillars within the structure.

FIGURES 10, 11 and 12 show a double skinned pallet incorporating in its upper wall, reinforcing elements of the kind described above. The upper wall 52 of the pallet has inserted into it nine equally spaced frusto-conical reinforcing elements 53. The upper wall is further strengthened by providing elongated depressions 54 between the elements 53.

The bottom wall 55 of the pallet is formed with circular depressions 56 providing projections 57 in the interior of the pallet. Each projection 57 is disposed opposite and engages a reinforcing element 53 and becomes fused to it during the blow-moulding process to form a continuous pillar joining the upper and lower walls 52 as shown in FIGURE 12.

The peripheral walls 58 of the pallet are formed with vertical strengthening corrugations 59. Apertures 60, for the insertion of lifting forks, are cut in the peripheral walls 58 after the blow-moulding of the pallet. The apertures are so disposed that fork arms inserted into them can pass between the pillars within the pallet.

Rectangular apertures 61 are also cut in the bottom wall 55 of the pallet, between the depressions 56.

We claim:
1. A double skinned pallet formed from plastics material and comprising:
   (a) an upper wall;
   (b) a lower wall;
   (c) a number of depressions, in at least one of said walls, providing projections within the pallet,
   (d) which projections have parts which are bonded to parts of the wall opposite to that in which they are formed so as to be integral therewith; and
   (e) a peripheral wall extending around the extreme peripheries of the upper and lower walls to support said peripheries,
   (f) the peripheral wall being integrally formed with the upper and lower walls.

2. A double skinned pallet according to claim 1 wherein said parts of the wall opposite to that in which said projections are formed, comprise parts of further projections within the pallet, which parts of the further projections are bonded to said parts of the first said projections so that each pair of projections form a pillar between the upper and lower walls of the pallet.

3. A pallet according to claim 1 wherein a depression in the wall of the pallet embraces a reinforcing element.

4. A pallet according to claim 3 wherein the reinforcing element substantially fills the depression the outer surface of the reinforcing element being level with the general plane of the wall of the pallet surrounding the depression.

5. A pallet according to claim 1 wherein two or more depressions in the lower wall of the pallet extend across that wall from a part of the periphery thereof; which depressions are so shaped and dimensioned that the fork arms of a fork lift vehicle may be inserted along said depressions for the purpose of lifting the pallet.

6. A pallet according to claim 1 wherein at least two holes are formed in the peripheral walls of the pallet, which holes are so shaped and dimensioned and are so disposed in relation to said projections within the pallet that the forks of a fork lift vehicle may be inserted into the pallet through said holes without obstruction.

References Cited

UNITED STATES PATENTS

| | | | |
|---|---|---|---|
| 2,991,965 | 7/1961 | Drieborg | 108—58 |
| 3,120,825 | 2/1964 | Johnson | 108—51 |
| 3,140,672 | 7/1964 | De Luca | 108—53 |
| 3,167,341 | 1/1965 | Higgins | 108—58 XR |
| 3,187,691 | 6/1965 | Leitzel | 108—58 |
| 3,228,358 | 1/1966 | Sepe et al. | 108—58 |
| 3,330,228 | 7/1967 | Donnelly | 108—51 |
| 3,187,689 | 6/1965 | Hess | 108—58 |
| 3,307,504 | 3/1967 | Cloyd et al. | 108—58 |
| 3,359,929 | 12/1967 | Carlson | 108—58 |
| 3,331,336 | 7/1967 | Scholde et al. | 108—57 |
| 3,135,640 | 6/1964 | Kepka et al. | 264—45 |
| 3,152,199 | 10/1964 | Roberts | 264—45 |
| 3,176,055 | 3/1965 | Loos | 264—45 |
| 3,177,271 | 4/1965 | Slayman | 264—45 |
| 3,269,336 | 8/1966 | Naylor et al. | 108—58 |
| 3,330,228 | 7/1967 | Donnelly | 108—51 |

BOBBY R. GAY, Primary Examiner

G. O. FINCH, Assistant Examiner

U.S. Cl. X.R.

108—58